(12) United States Patent
Jancic et al.

(10) Patent No.: US 8,943,748 B2
(45) Date of Patent: Feb. 3, 2015

(54) WATER SELF REGULATED HORTICULTURAL GROWING AND SUPPORT MEDIUM

(75) Inventors: Anne Jancic, Kesteren (NL); Huib Hesse, Kesteren (NL); Bert Van Dijk, Kesteren (NL)

(73) Assignee: Rectigro B.V., Kesteren (NL)

( * ) Notice: Subject to any disclaimer, the term of this patent is extended or adjusted under 35 U.S.C. 154(b) by 0 days.

(21) Appl. No.: 14/002,085

(22) PCT Filed: Feb. 29, 2012

(86) PCT No.: PCT/EP2012/053446
§ 371 (c)(1),
(2), (4) Date: Oct. 23, 2013

(87) PCT Pub. No.: WO2012/117022
PCT Pub. Date: Sep. 7, 2012

(65) Prior Publication Data
US 2014/0033608 A1  Feb. 6, 2014

(30) Foreign Application Priority Data
Mar. 1, 2011 (EP) .................................. 11156480

(51) Int. Cl.
*A01G 31/00* (2006.01)
(52) U.S. Cl.
CPC ........ *A01G 31/001* (2013.01); *A01G 2031/003* (2013.01)
USPC .......................................................... 47/59 S
(58) Field of Classification Search
CPC .................. A01G 31/00; A01G 9/02
USPC ..................................... 47/59 S, 65.9
See application file for complete search history.

(56) References Cited

U.S. PATENT DOCUMENTS

| | | | |
|---|---|---|---|
| 3,877,172 A | 4/1975 | Schwab et al. | |
| 4,023,308 A | 5/1977 | Staby | |
| 7,342,058 B2 | 3/2008 | Peppmoller et al. | |
| 7,739,833 B2 | 6/2010 | Ramsey et al. | |
| 2010/0075400 A1* | 3/2010 | Kania et al. | 435/243 |

FOREIGN PATENT DOCUMENTS

| | | |
|---|---|---|
| DE | 100 08 021 | 8/2001 |
| EP | 0 476 828 | 3/1992 |
| FR | 2 609 720 | 7/1988 |
| JP | 2002-84889 | 3/2002 |
| JP | 2004-229637 | 8/2004 |
| WO | WO 94/03045 | 2/1994 |
| WO | WO 96/03030 | 2/1996 |
| WO | WO 00/35997 | 6/2000 |

* cited by examiner

Primary Examiner — Monica Williams
(74) Attorney, Agent, or Firm — Levy & Grandinetti

(57) ABSTRACT

A horticultural growing and support medium is disclosed. The horticultural growing and support medium includes a synthetic foam slab permeable to water. The foam slab has a first growing surface, wherein plants grow to ambient, and an opposite second draining surface, separated from the growing surface by the thickness of the block. A limited portion only of the second draining surface is coated with a coating having a permeability to water substantially lower than the slab material, preferably substantially impervious to water, for controlling the draining and storage of water contained in the slab. The porous slab is made of a synthetic foam having an open porosity.

20 Claims, 3 Drawing Sheets

(a)

(b)

WATER SELF REGULATED HORTICULTURAL GROWING AND SUPPORT MEDIUM

This Application is the U.S. National Phase International Application Number PCT/EP2012/053446 filed Feb. 29, 2012, which claims priority to European Application Number 11156480.3 filed on Mar. 1, 2011.

TECHNICAL FIELD

The present invention relates to plant supports media for greenroofs, green walls and similar applications. In particular, it concerns a porous slab permeable to water, preferably a foam slab, comprising an integral draining control functionality, allowing an optimal control of the water balance in the foam.

BACKGROUND FOR THE INVENTION

Growing plants on an inert medium as mechanical support provided with other components such as seeds, nutrients, and the like is known in the art. In some instances, the mechanical support is in the form of loose particulate material such as peat, vermiculite, perlite, fly ash, pumice, rock wool, glass wool, organic and inorganic fibres or particles, and the like. The problem with these materials, sometimes admixed with soil, is that they can be washed away rather easily with running water and wind (cf. e.g., JP2004229637, US2004132869). Alternatively, the inert support can be in the form of a self supported material in the form of slabs, block, or mats of various rigidities and thicknesses (cf. e.g., U.S. Pat. No. 3,877,172). The same materials as listed above can be used in such forms of support and, since said self supported materials must be permeable to water, the use of foams with open porosity of controlled dimension has been proposed quite advantageously. Apart from the enhanced stability of such foams compared with support in particulate form, foams can be used to dress steep slopes and even vertical walls without any problem. In order to manage the water balance within the foam, foam supports must be provided with a drainage system. The control of water drainage is very important. Indeed, if the drainage is insufficient, water will saturate the structure and stagnate around the roots. On the other hand, water would just wash through the material in case of excessive drainage, thus depleting the roots from water when needed.

For example, U.S. Pat. No. 4,023,308 discloses a foraminous support body to be placed in the bottom of the container and prior to the time it is placed therein, it is perforated to form cylindrical conduits vertically completely through the foraminous body wherein the perforations are about 1-5 mm in diameter and are spaced apart about 1-8 mm. This solution allows to control the permeability of the support slab, but not to retain any water therein. It therefore does not permit to manage the water balance within the support material.

JP2002084889 proposes a plate-like, water-retaining pad for greening rooftops comprising the solidified product of fibres with a foamed polyurethane and compression-moulding longitudinal and latitudinal grooves on the back side of the pad.

DE10008021 discloses a water retaining and draining pad comprising bonded rubbery granules, covered by a fleece or felt layer. The covering as a whole is both waterproof and stores water. Granularity and production are controlled, to assure adequate water retention and permeability.

US 2007186467 proposes a foamed glass plant growth support structure, including a foamed glass substrate and a plurality of interconnected pores distributed throughout the substrate. The substrate is characterized by a porosity of at least about 80 percent. The pore size is substantially between about 0.2 and about 5 millimeters and the substrate is sufficiently chemically stable such that water filling the plurality of interconnected pores experiences a pH shift of less than 0.5.

WO94/03045 discloses a mineral wool shaped body provided with a water barrier or water permeability inhibiting coating layer made of argillaceous materials, clays or their artificial mixtures applied on the bottom surface and side surfaces of the body, so that a water storage is formed inside the body.

All the above products offer a solution to control the water percolation through a porous structure, and some of them teach how to evacuate water with draining grooves, but none offers a global water management solution, wherein excess water is drained out of the foam to avoid stagnation, but wherein a controlled amount of water is nonetheless stored, to maintain a constant level of moisture, thus acting as a water buffer. The present invention proposes a solution to this and to other problems as will appear clearly from the following description of the invention. In particular, supports can be inert or be provided with a plant growth promoting functionality by incorporating within the porous support material additives such as fertilizers, plant nutrients, and pesticides. The present invention proposes a solution how to incorporate such additives within the support.

SUMMARY OF THE INVENTION

The present invention is defined in the appended independent claims. Preferred embodiments are defined in the dependent claims. In particular, the present invention concerns a horticultural growing and support medium comprising a porous slab, preferably a synthetic foam, which is permeable to water, said slab comprising:
(a) a first, growing surface, whence plants grow to ambient and
(b) an opposite second, draining surface, separated from the growing surface by the thickness of the slab,
wherein a limited portion only of the second, draining surface is coated with a coating having a water permeability which is substantially lower than the water permeability of the porous slab, optionally substantially impervious to water, for controlling the draining and storage of water contained in the slab. Preferably, the coating is dispersed throughout the whole area of the draining surface as discrete islands and characterized in that, the porous slab is made of a synthetic foam having an open porosity In a preferred embodiment, the draining surface is structured, comprising a number of protrusions extending away from the plane of the draining surface. Said protrusions are preferably substantially conical in shape, but other shapes are possible, such as pyramidal, toroidal, prismatic, such as elongated square-based or triangle-based prisms like Toblerone chocolate packaging. At least the tips of said protrusions should be coated with said coating to create reservoirs wherein water can be stored and reached by the plant roots when needed. This forms a self regulated water buffering system.

By controlling the volume of the substantially impervious portion of the protrusions, and the fraction of the draining surface which is permeable to water, it is possible to modulate the water buffering properties of the material at will. For example, the thickness of the slab from the growing surface to the base of the protrusions can be comprised between 30 and 500 mm, and the protrusions may have a height comprised between 15 and 60% of said slab thickness. Their dimensions at the base of the protrusion may be comprised between 10 and 50 mm. In one embodiment, substantially the whole surface of the protrusions is coated with a low permeability coating, whilst the area of the drainage surface between the protrusions is substantially devoid of said coating. It is preferred that between 10 and 90%, preferably between 20 and 70%, more preferably 30 to 50% of the area of the orthogonal projection of the drainage surface onto a surface parallel to the growing surface is coated with said coating.

The synthetic foam slab can be made of any material suitable for the purpose. In particular, synthetic resins can be phenol-formaldehyde foams, urea-formaldehyde foams, melamine-formaldehyde foams, polyurethane foams, and can have a porosity preferably comprised between 50 and 98 vol. %, and when saturated with water, a remaining, closed porosity comprised between 0 and 25 vol. % preferably between 5 and 20 vol. %. In a preferred embodiment, the slab is made of a polyurethane foam.

The coating material is not necessarily fully impervious to water. Actually, some water permeability is preferred in order to prevent the formation of long lasting pools of stagnant water. In the present context, the expression "permeability to water substantially lower than the one of the porous slab" means herein at least twice as low, preferably at least ten times lower, more preferably 50 times lower. Preferably, the coating material is a crosslinkable resin selected among epoxy, polyurethane, and polyester. Polyurethane coating is actually preferred, in particular if the slab is a polyurethane foam. The coating material is preferably applied in an amount comprised between 50 and 1000 g/m$^2$, more preferably between 150 and 500 g/m$^2$ with respect to the coated portion of the drainage surface.

The growing and support medium of the present invention preferably comprises an additive such as organic or inorganic fertilizers, plant nutrients, or pesticides. If the porous support is a foam, for instance a polyurethane foam, these additives can be incorporated in the foam by adding them to the polyurethane reaction mixture. It is important, especially for heat sensitive additives, like organic fertilisers, to control the reaction exotherm such as to not affect the activity of the additives. If the foam is a polyurethane foam, this reaction exotherm can be decreased by producing the foam according to the prepolymer process, which is well known to the man skilled in the art. It is also possible to decrease the reaction exotherm by using phase change materials, as disclosed in WO0035997A1.

The present invention also concerns the use of a growing and support medium as discussed above, for dressing rooftops, slopes, walls, and the like, and for supporting and promoting growth of plants.

BRIEF DESCRIPTION OF THE FIGURES

For a fuller understanding of the nature of the present invention, reference is made to the following detailed description taken in conjunction with the accompanying drawings in which.

DETAILED DESCRIPTION OF THE INVENTION

The horticultural growing and support medium of the present invention comprises a synthetic foam slab having an open porosity and being permeable to water. The slab is self supported and may be rigid or flexible, depending of the application. The former being more adapted for dressing steep to vertical flat surfaces like walls, whilst the latter are more suitable for dressing uneven surfaces.

The slab may be made of any expandable synthetic material known in the art as suitable horticultural support structure for growing plants, seeds, cuttings and the like. The synthetic foam may be any of phenol-formaldehyde foams, urea-formaldehyde foams, melamine-formaldehyde foams, polyurethane foams. A polyurethane foam is preferred as the mechanical properties of polyurethane foams can be modulated easily, ranging from stiff foams to highly flexible ones. The porosity of the slab is preferably comprised between 20 and 98 vol. %, to allow water percolation and also to allow the roots of the plants to penetrate and take seat in the core of the foam.

One major problem with reactive foam materials, is that their crosslinking is generally exothermic, increasing substantially the temperature of the system to values which are detrimental to the activity of many additives, such as fertilizers, plant nutrients, or pesticides, that could be incorporated within the foam material to add thereto a plant growing functionality. Therefore it is recommended to lower the reaction exotherm of the foam forming reaction. When the foam is polyurethane foam for example, it is recommended to use the prepolymer technique, instead of using the one-shot process, in order to lower the reaction exotherm. The prepolymer technique for producing polyurethane foam is well known in the art, as well as other techniques to lower the reaction exotherm, such as using phase change materials. Additives such as fertilizers, plant nutrients, or pesticides can thus be incorporated in the foam and maintain their activity even with foam materials normally having high crosslinking exotherms, and thus provide an added value by integrating a plant growth promoting functionality to the foam support.

The porous slab of the present invention comprises:
(a) a first, growing surface (1), which in use is exposed to ambient and whence plants grow out and
(b) an opposite second, draining surface (2), separated from the growing surface by the thickness of the slab.

Figure 1:
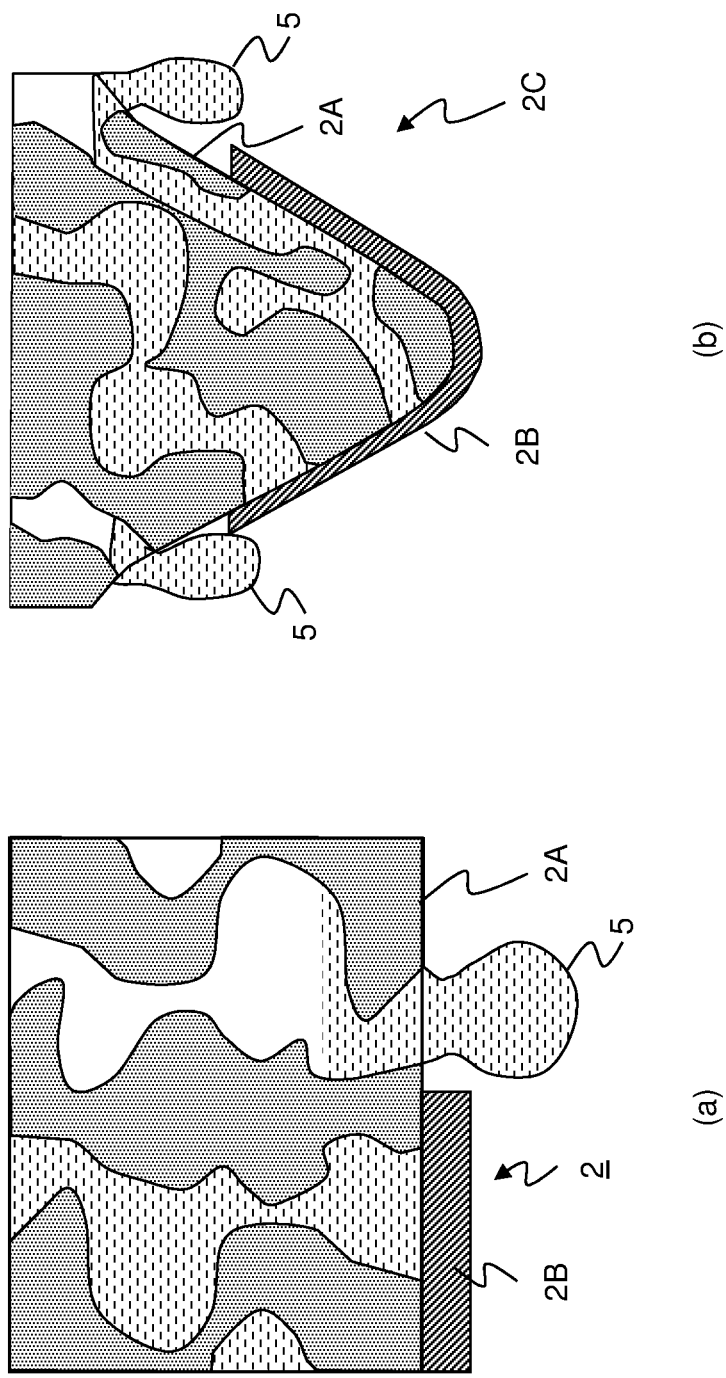
FIG. 1: schematically illustrates the water buffering principle of the present invention (a) smooth drainage surface, (b) at a protrusion of the drainage surface.

Water can percolate from the first, growing surface to the second, draining surface through a net of interconnected pores. In order to control the amount of water flowing out of the second, draining surface, a limited portion only thereof is coated with a coating (2B) having a water permeability substantially lower than the water permeability of the slab material, for controlling the draining and storage of water contained in the slab. As illustrated in FIG. 1(*a*), the water reaching a coated portion (2B) of the draining surface (2) is retained in the pores of the slab, whilst the water reaching an uncoated portion (2A) flows out of the slab. The partial coating (2B) of the draining surface (2) thus allows to control the water draining rate of the slab and acts as a water buffer, retaining water within the slab for use by the plants when needed. The coating (2B) can be water impervious allowing no water to flow out at all, but it is actually preferred that it shows a limited permeability to water, substantially lower than the permeability of the slab material (i.e., at least 2×, or even 50× lower), to slow down considerably the flow of water reaching a coated portion (2B) of the draining surface, whilst preventing the formation of pools of stagnant water.

The coating (2B) is preferably dispersed throughout the whole area of the draining surface as discrete islands in order to form a multitude of local water buffering systems of small dimensions but readily reachable by the roots of plants. As illustrated in FIG. 1(a), it can be seen that the porous network opening at a coated portion (2B) of the drainage surface will store water, which is prevented or substantially slowed down by the coating from flowing out of the drainage surface (2). Inversely, the water (5) reaching an uncoated portion (2A) of the drainage surface will freely flow out thereof. With coating islands dispersed throughout the drainage surface, a network of water microreservoirs is formed, which serve as many water buffers.

If the drainage surface is flat, the slab needs be laid on top of a drainage layer provided with means for evacuating the water (5) flowing out of the drainage surface (2). Such layers are well known in the art and are readily available in the market. In an advantageous embodiment of the present invention, the drainage surface (2) is structured, comprising a number of protrusions (2C) extending out. At least the tips of said protrusions are coated with said low permeability coating (2B) as illustrated in FIG. 1(b). At the same time, the coated portion of each protrusion acts like a small vessel for storing an amount of water. The protrusions serve to form a draining network of grooves for channelling the excess of water away from the system. A slab provided with a structured drainage surface is highly advantageous as it does not require to be used together with a separate drainage layer, and can be used on its own.

Figure 2:
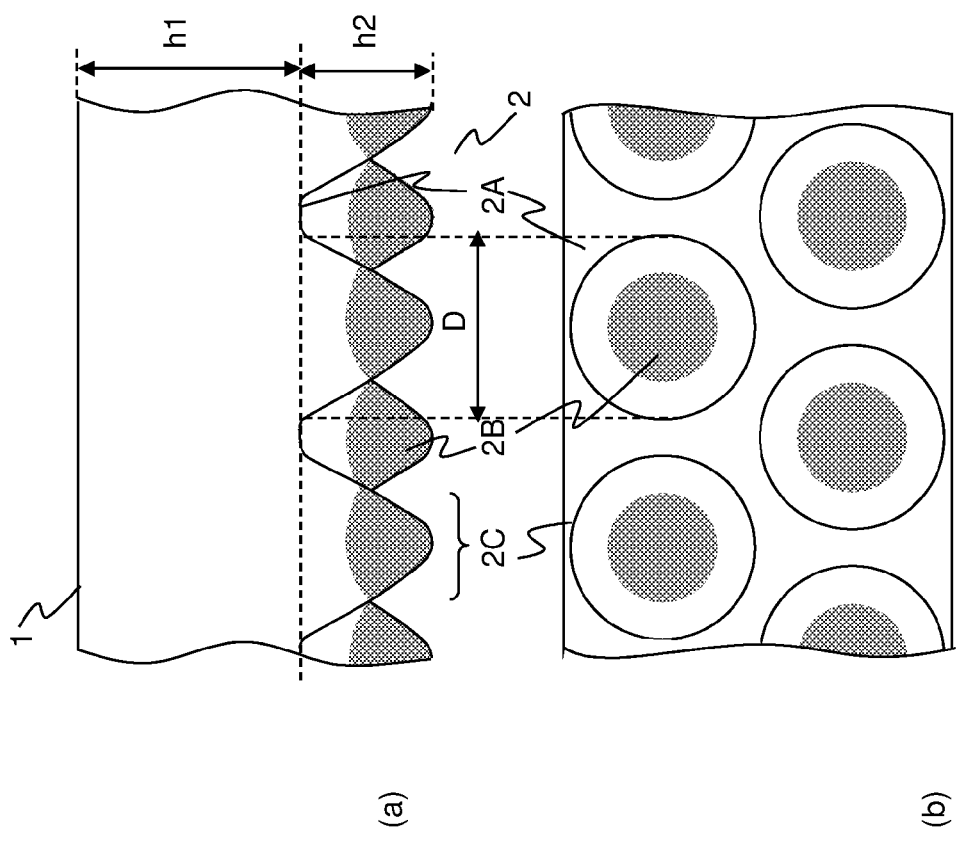
FIG. 2: shows an embodiment of support medium according to the present invention (a) side view, (b) bottom view.

The geometry and distribution of the protrusions throughout the drainage surface can be any that satisfies the requirements of drainage. In particular, the protrusions can have a substantially conical shape as illustrated in FIG. 2. The cones are preferably dispersed throughout the drainage surface and at least the tip portion thereof is coated (cf. FIGS. 1(b) and 2). Any other similar shape, like pyramids, tetrahedrons, spherical caps and the like can be used instead without departing from the scope of the present invention.

Figure 3:
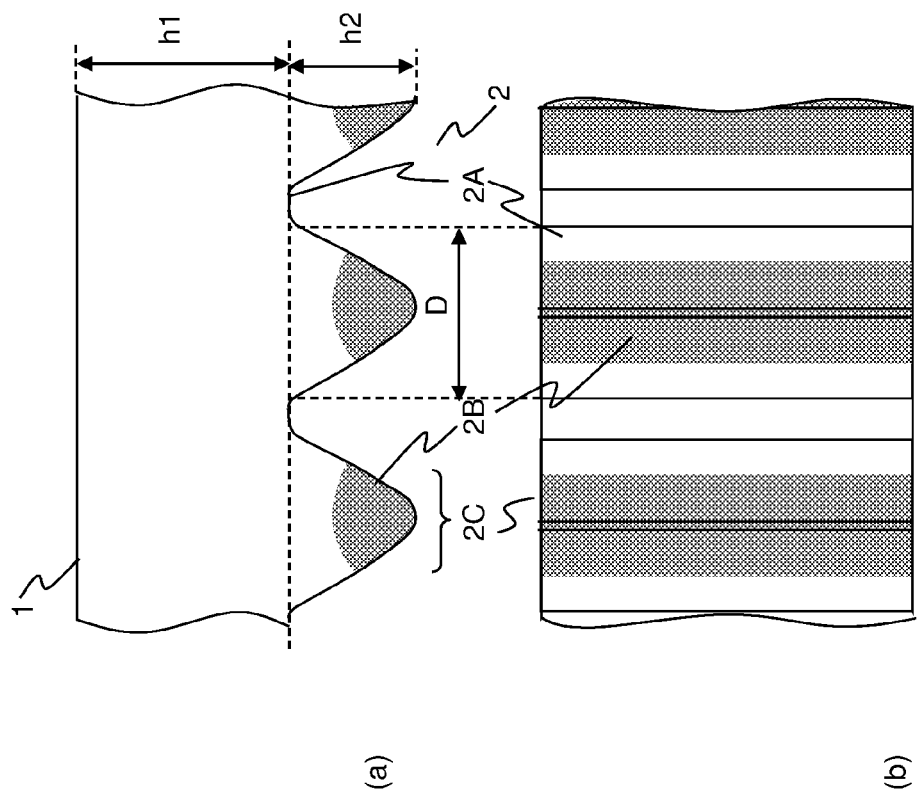
FIG. 3: shows a second embodiment of support medium according to the present invention (a) side view, (b) bottom view

In a preferred embodiment, substantially the whole surface of the protrusions (2C) is coated with coating (2B), whilst the area (2A) of the drainage surface between the protrusions is substantially devoid of said coating (2B). In yet another embodiment, the protrusions (2C) can extend linearly forming a series of substantially parallel coated ridges (2B), separated by uncoated drainage grooves (2A) as illustrated in FIG. 3. The transverse cross-section of each linear ridge can have any desired shape, such as a triangle (as illustrated in FIG. 3), a trapezoid, a rectangle, a curved arc, and the like.

The thickness of a slab according to the present invention, extending from the growing surface (1) to the base of the protrusions, if any, is preferably comprised between 30 and 500 mm, depending on the applications: the thinner slabs can be used in plant pots whilst the thicker ones are used for dressing large extents like rooftops, walls, road sides, and the like. The protrusions, if any, generally have a height comprised between 15 and 60% of the slab thickness. Their geometry and distribution depend on the drainage requirements for a particular application, the expected exposure to water and on the permeability of the slab. The base of the protrusions has a width, D, in one direction generally comprised between 5 and 100 mm, preferably between 10 and 50 mm. For conical protrusions, the width, D, is the diameter of the base. For other closed geometries, the equivalent diameter is used instead. For longitudinal protrusions as illustrated in FIG. 3, the width in one direction is the shortest width measured across the protrusion.

Regardless of whether the drainage surface (2) comprises protrusions or not, the coating material (2B) is preferably applied upon 10 to 80%, preferably between 20 and 50% of the area of the orthogonal projection of the drainage surface (2) onto a surface parallel to the growing surface (1). This means that water is free to flow out through about 90 to 20% of the projected area corresponding to uncoated portions (2A), whilst it is retained within about 10 to 80% of said projected area. This shows how easily the water management properties of a slab according to the present invention can be varied at will, playing on the water permeability of the slab and coating, on the coated area of the drainage surface, and on the protrusions geometry and distribution.

The coating material can be selected among a wide selection of resins readily available in the market. It should be compatible with the slab material and form a strong bond therewith. It must be water resistant, and resistant to the chemicals usually applied onto plant, like fertilizers, pesticides, and the like. As discussed above, it may be totally impervious to water, but this is not mandatory. On the contrary, a limited permeability to water is advantageous to prevent the formation of pools of stagnant water. It is preferably permeable to gases such as oxygen and nitrogen, to prevent accumulation of such gases in the slab.

Crosslinking resins and hotmelts can be used for the coating (2B), as long as their application is compatible with the integrity of the slab foam. Crosslinking can be activated thermally, or by radiation. Epoxy resins, polyesters, crosslinkable polyurethanes are particularly suitable for the present application. For hotmelts, care must be taken that their application temperature is compatible with the slab foam. For example polyurethane hotmelts, polyolefins, like polyethylene or polypropylene, polyamides, polyester hotmelts, and the like can be used for coating portions of the drainage surface.

The coating (2B) is preferably applied onto specific portions of the drainage surface (2) in an amount comprised between 30 and 200 $g/m^2$, more preferably between 50 and 100 $g/m^2$. Any technique known by the person skilled in the art for applying discrete coating islands onto a structured surface can be used for the application of the coating (2B) and is not critical for the present invention.

The invention claimed is:

1. A horticultural growing and support medium comprising a porous slab permeable to water, said porous slab comprising:
   (a) a first, growing surface, whence plants grow to ambient and
   (b) an opposite second, draining surface, separated from the growing surface by the thickness of the slab,
   wherein a limited portion of only the second, draining surface is coated with a coating having a water permeability substantially lower than the water permeability of the porous slab for controlling the draining and storage of water contained in the slab,
   wherein, the porous slab is made of a synthetic foam having an open porosity.

2. A horticultural growing and support medium according to claim 1, wherein the coating is distributed over the whole area of the draining surface as discrete islands.

3. A horticultural growing and support medium according to claim 1, wherein the draining surface is structured, comprising a number of protrusions.

4. A horticultural growing and support medium according to claim 3, wherein the protrusions are substantially conical in shape, at least the tips of which being coated with said coating to act as water buffers.

5. A horticultural growing and support medium according to claim 3, wherein the thickness of the slab from the growing surface to the base of the protrusions is comprised between 30 and 500 mm, and the protrusions have a height comprised between 15 and 60% of the slab thickness and have a width in one direction at the base thereof comprised between 10 and 50 mm.

6. A horticultural growing and support medium according to claim 5, wherein the protrusions are substantially conical in shape, at least the tips of which being coated with said coating to act as water buffers.

7. A horticultural growing and support medium according to claim 3, wherein substantially the whole surface of the protrusions is coated with coating, while the area of the drainage surface extending between the protrusions is substantially devoid of said coating.

8. A horticultural growing and support medium according to claim 7, wherein the protrusions are substantially conical in shape, at least the tips of which being coated with said coating to act as water buffers.

9. A horticultural growing and support medium according to claim 1, wherein the synthetic foam is selected among the group of phenol-formaldehyde foams, urea-formaldehyde foams, melamine-formaldehyde foams, and polyurethane foams said synthetic foam having a porosity comprised between 20 and 98 vol. %, with a closed porosity of not more than 25 vol. %.

10. A horticultural growing and support medium according to claim 9, wherein the protrusions are substantially conical in shape, at least the tips of which being coated with said coating to act as water buffers.

11. A horticultural growing and support medium according to claim 1, wherein the coating material is a hotmelt adhesive or a crosslinkable resin selected among epoxy, polyurethane, and polyester and is applied onto the portion of the drainage surface to be coated.

12. A horticultural growing and support medium according to claim 11, wherein the protrusions are substantially conical in shape, at least the tips of which being coated with said coating to act as water buffers.

13. A horticultural growing and support medium according to claim 11, wherein the coating material is applied onto the portion of the drainage surface to be coated in an amount comprised between 50 and 1000 g/m$^2$.

14. A horticultural growing and support medium according to claim 13, wherein the protrusions are substantially conical in shape, at least the tips of which being coated with said coating to act as water buffers.

15. A horticultural growing and support medium according to claim 1, wherein between 10 and 90% of an area, A, of an orthogonal projection of the drainage surface onto a surface parallel to the growing surface is coated with coating.

16. A horticultural growing and support medium according to claim 15, wherein the protrusions are substantially conical in shape, at least the tips of which being coated with said coating to act as water buffers.

17. A horticultural growing and support medium according to claim 1 comprising additives selected from the group of fertilizers, plant nutrients, and pesticides.

18. A horticultural growing and support medium according to claim 17, wherein the protrusions are substantially conical in shape, at least the tips of which being coated with said coating to act as water buffers.

19. A horticultural growing and support medium according to claim 1, for supporting and promoting growth of plants rooftops, slopes, or walls.

20. A horticultural growing and support medium according to claim 19, wherein the protrusions are substantially conical in shape, at least the tips of which being coated with said coating to act as water buffers.

* * * * *